US012503338B2

(12) United States Patent
Mosher et al.

(10) Patent No.: US 12,503,338 B2
(45) Date of Patent: Dec. 23, 2025

(54) HYBRID COMPENSATION MEMBER

(71) Applicant: Otis Elevator Company, Farmington, CT (US)

(72) Inventors: Daniel A. Mosher, Glastonbury, CT (US); Kyle B. Martin, Avon, CT (US); Wenping Zhao, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1083 days.

(21) Appl. No.: 16/023,586

(22) Filed: Jun. 29, 2018

(65) Prior Publication Data

US 2020/0002132 A1 Jan. 2, 2020

(51) Int. Cl.

*B66B 7/06* (2006.01)
*D07B 1/00* (2006.01)
*D07B 1/06* (2006.01)

(52) U.S. Cl.

CPC .............. *B66B 7/068* (2013.01); *D07B 1/005* (2013.01); *D07B 1/068* (2013.01); *D07B 1/0686* (2013.01); *D07B 2201/2082* (2013.01); *D07B 2205/3007* (2013.01); *D07B 2205/3025* (2013.01); *D07B 2501/2007* (2013.01)

(58) Field of Classification Search

CPC ......... B66B 7/062; B66B 7/068; D07B 1/005; F16G 1/12

See application file for complete search history.

(56) References Cited

U.S. PATENT DOCUMENTS 4,664,229 A 5/1987 Obst
4,716,989 A 1/1988 Coleman et al.
4,724,929 A 2/1988 Coleman et al.
6,672,046 B1 * 1/2004 Prewo .................... D07B 1/005 57/232
6,837,340 B2 1/2005 Strauss et al.
7,410,033 B2 8/2008 Veronesi et al.
8,052,820 B2 11/2011 O'Donnell et al.
9,051,651 B2 6/2015 Veronesi et al.
9,126,805 B2 9/2015 Pelto-Huikko et al.
9,828,214 B2 * 11/2017 Pelto-Huikko .......... D07B 1/04
9,914,622 B2 * 3/2018 Valjus ....................... B66B 7/10
9,944,493 B2 * 4/2018 Dudde .................... B66B 7/062
9,944,494 B2 4/2018 Alasentie et al.
2018/0170713 A1 * 6/2018 Sherrick ................ B66B 7/062

(Continued)

FOREIGN PATENT DOCUMENTS

CN 2811243 Y 8/2006
CN 101075485 A 11/2007
CN 102392375 A 3/2012

(Continued)

OTHER PUBLICATIONS

European Search Report Issued in EP Application No. 19183419.1, Mail Date Nov. 18, 2019, 37 Pages.

*Primary Examiner* — Minh Truong

(74) *Attorney, Agent, or Firm* — CANTOR COLBURN LLP

(57) ABSTRACT

A compensation and tie-down member for an elevator system includes one or more lightweight compensation tension elements having a first tensile strength/unit mass/unit length, and one or more heavier weight compensation tension elements having a second tensile strength/unit mass/unit length less than the first tensile strength/unit mass/unit length.

13 Claims, 8 Drawing Sheets

(56) References Cited

U.S. PATENT DOCUMENTS

2019/0382241 A1 * 12/2019 Gurvich .................. B66B 7/062

FOREIGN PATENT DOCUMENTS

| | | | |
|---|---|---|---|
| CN | 104044973 | A | 9/2014 |
| CN | 102517940 | B | 6/2016 |
| CN | 105802060 | A | 7/2016 |
| EP | 2316613 | B1 | 12/2014 |
| WO | 2018077654 | A1 | 5/2018 |

* cited by examiner

HYBRID COMPENSATION MEMBER

BACKGROUND

Exemplary embodiments pertain to the art of elevator systems. More particularly, the present disclosure relates to compensation members for high rise elevator systems utilizing lightweight suspension members.

Elevator systems utilize a suspension member operably connected to an elevator car and a counterweight in combination with, for example, a machine and traction sheave, to suspend and drive the elevator car along a hoistway. In high speed applications, typically greater than 3.5 m/s, compensation and tie-down members similarly extend between the elevator car and the counterweight, but via a tie-down sheave typically located in the bottom of the hoistway. The compensation member and tie-down sheave serve to stabilize operation of the elevator system.

High rise elevator systems utilizing lightweight suspension members require similarly lightweight members for compensation and tie-down. For high performance lightweight suspension members, approximately >3× strength/mass/length of wire rope, and high rises, approximately greater than 500 meters, wire rope of the same mass per unit length as the lightweight suspension member will not have sufficient strength for tie-down. On the other hand, utilizing the same lightweight member for both suspension and compensation and tie-down results in a compensation member having a strength exceeding what is required for tie-down by approximately a factor of 2, and which will increase cost of the elevator system.

BRIEF DESCRIPTION

In one embodiment, a compensation and tie-down member for an elevator system includes one or more lightweight compensation tension elements having a first tensile strength/unit mass/unit length, and one or more heavier weight compensation tension elements having a second tensile strength/unit mass/unit length less than the first tensile strength/unit mass/unit length.

Additionally or alternatively, in this or other embodiments the one or more lightweight compensation tension elements each comprise a plurality of fibers located in a matrix material.

Additionally or alternatively, in this or other embodiments the one or more heavier weight compensation tension elements each include a plurality of steel wires.

Additionally or alternatively, in this or other embodiments the compensation and tie-town member is configured as a compensation belt with the one or more lightweight compensation tension elements and the one or more heavier weight compensation tension elements are arrayed across a lateral width of the compensation and tie-down member.

Additionally or alternatively, in this or other embodiments a compensation jacket at least partially encapsulates the one or more lightweight compensation tension elements and the one or more heavier weight compensation tension elements.

Additionally or alternatively, in this or other embodiments the one or more heavier weight compensation tension elements are located at a laterally outermost position in the compensation and tie-down member.

Additionally or alternatively, in this or other embodiments the one or more lightweight compensation tension elements and the one or more heavier weight compensation tension elements are arranged as a rope.

Additionally or alternatively, in this or other embodiments the one or more heavier weight compensation tension elements is located at a center of the rope as a center strand, with the one or more lightweight compensation tension elements located as outer strands of the rope.

Additionally or alternatively, in this or other embodiments one or more lightweight compensation tension elements and one or more heavier weight compensation tension elements are arranged as outer strands of the rope.

In another embodiment, an elevator system includes a hoistway, an elevator car movable along the hoistway, one or more suspension members operably connected to the elevator car to move the elevator car along the hoistway, a counterweight operably connected to the elevator car via the one or more suspension members, and one or more compensation and tie-down members operably connected to the elevator car and the counterweight to stabilize operation of the elevator system. The one or more compensation and tie-down members includes one or more lightweight compensation tension elements having a first tensile strength/unit mass/unit length, and one or more heavier weight compensation tension elements having a second tensile strength/unit mass/unit length less than the first tensile strength/unit mass/unit length.

Additionally or alternatively, in this or other embodiments a total suspension member mass per unit length of the one or more suspension members is within +/−10% of a total compensation member mass per unit length of the one or more compensation and tie-down members.

Additionally or alternatively, in this or other embodiments the one or more suspension members each include a plurality of suspension tension elements, each suspension tension element including a plurality of fibers located in a matrix material.

Additionally or alternatively, in this or other embodiments a total number of compensation tension elements in the one or more compensation elements is fewer than the total number of suspension tension elements in the one or more suspension elements.

Additionally or alternatively, in this or other embodiments the number of compensation and tie-down members is fewer than the number of suspension members.

Additionally or alternatively, in this or other embodiments the one or more lightweight compensation tension elements each include a plurality of fibers located in a matrix material.

Additionally or alternatively, in this or other embodiments the one or more heavier weight compensation tension elements each include a plurality of steel wires.

Additionally or alternatively, in this or other embodiments the compensation and tie-down member is configured as a compensation belt with the one or more lightweight compensation tension elements and the one or more heavier weight compensation tension elements are arrayed across a lateral width of the compensation and tie-down member.

Additionally or alternatively, in this or other embodiments a compensation jacket at least partially encapsulates the one or more lightweight compensation tension elements and the one or more heavier weight compensation tension elements.

Additionally or alternatively, in this or other embodiments the one or more heavier weight compensation tension elements are located at a laterally outermost position in the compensation and tie-down member.

Additionally or alternatively, in this or other embodiments the one or more lightweight compensation tension elements and the one or more heavier weight compensation tension elements as arranged as a rope.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
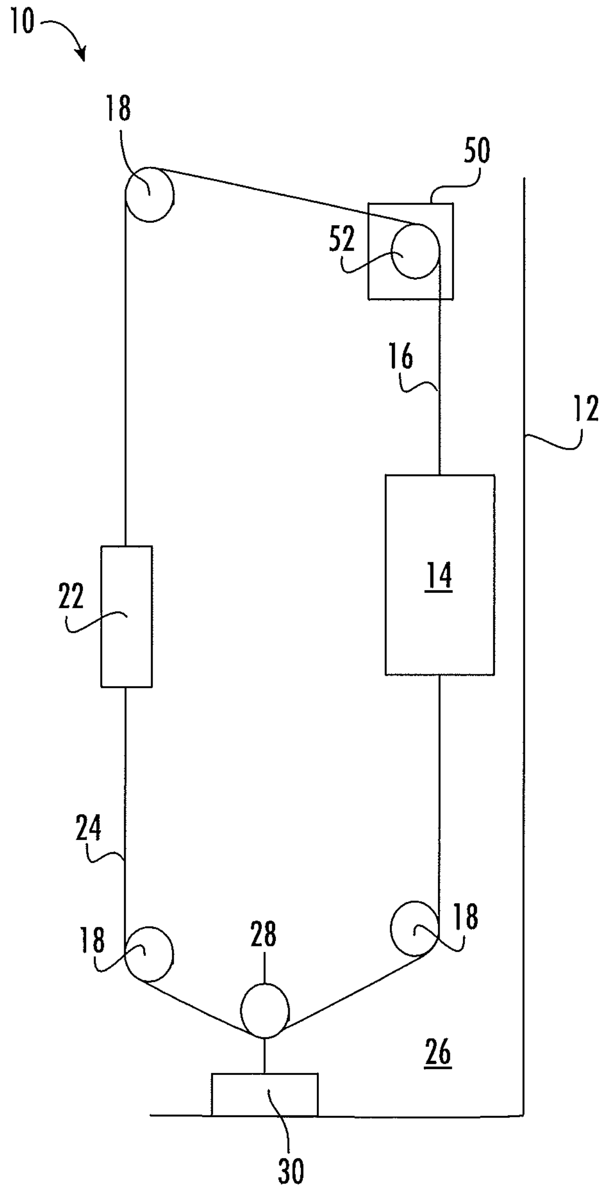
FIG. 1 is a schematic illustration of an elevator system.

Shown in FIG. 1 is a schematic view of an exemplary traction elevator system 10. Features of the elevator system 10 that are not required for an understanding of the present invention (such as the guide rails, safeties, etc.) are not discussed herein. The elevator system 10 includes an elevator car 14 operatively suspended or supported in a hoistway 12 with one or more suspension members 16, for example, one or more belts. The one or more suspension members 16 interact with sheaves 18 and 52 to be routed around various components of the elevator system 10. Sheave 18 is configured as a diverter, deflector or idler sheave and sheave 52 is configured as a traction sheave, driven by a machine 50. Movement of the traction sheave 52 by the machine 50 drives, moves and/or propels (through traction) the one or more suspension members 16 that are routed around the traction sheave 52. Diverter, deflector or idler sheaves 18 are not driven by a machine 50, but help guide the one or more suspension members 16 around the various components of the elevator system 10. The one or more suspension members 16 could also be connected to a counterweight 22, which is used to help balance the elevator system 10 and reduce the difference in belt tension on both sides of the traction sheave during operation. The sheaves 18 and 52 each have a diameter, which may be the same or different from each other.

The elevator system 10 further includes one or more compensation and tie-down members 24 extending from the elevator car 14 toward a hoistway pit 26 around a tie-down sheave 28 and up to the counterweight 22. A tie-down mass 30 is disposed in the hoistway pit 26 and affixed to the tie-down sheave 28. The compensation and tie-down members 24, tie-down sheave 28 and tie-down mass 30 stabilize motion of the elevator car 14 along the hoistway 12.

Figure 2:
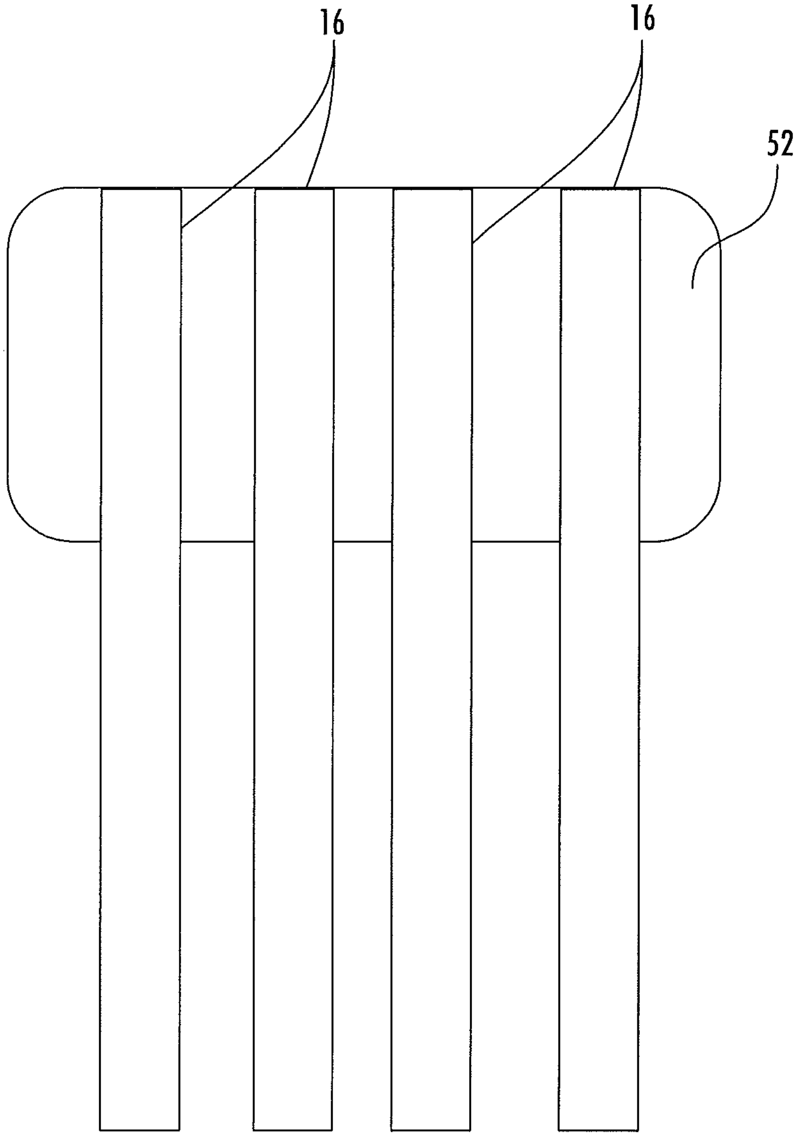
FIG. 2 is a schematic illustration of suspension member arrangement at a drive sheave.

Referring now to FIG. 2, in some embodiments, the elevator system 10 includes a plurality of suspension members 16, for example, four suspension members 16 that interact with the drive sheave 52 to suspend and move the elevator car 14 along the hoistway 12. While four suspension members 16 are illustrated in FIG. 2, the number of illustrated suspension members 16 is merely exemplary. One skilled in the art will readily appreciate that other quantities of suspension members 16, for example, two, six or eight suspension members 16 may be utilized.

The suspension members 16 are constructed to meet belt life requirements and have smooth operation, while being sufficiently strong to be capable of meeting strength requirements for suspending and/or driving the elevator car 14 and counterweight 22.

Figure 3:
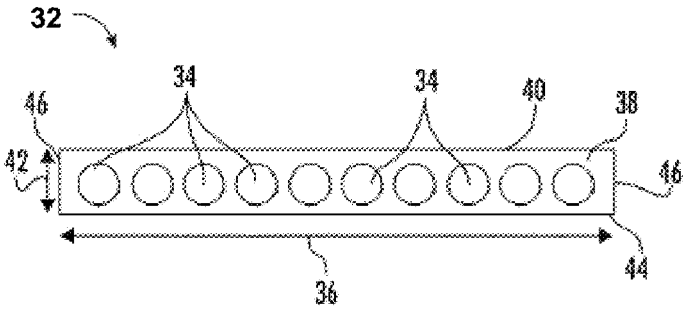
FIG. 3 is a cross-sectional view of an embodiment of an elevator system suspension member.

Referring now to FIG. 3, in some embodiments the suspension member is configured as a belt 32. While the suspension member is described herein as a belt 32, that configuration is merely exemplary. In other embodiments, other types of suspension members may be utilized, such as a synthetic fiber rope. The belt 32 includes a plurality of tension elements 34 extending longitudinally along the belt 32 and arranged across a belt width 36. The tension elements 34 are at least partially enclosed in a jacket material 38 to restrain movement of the tension elements 34 in the belt 32 with respect to each other and to protect the tension elements 34. The jacket material 38 defines a traction side 40 configured to interact with a corresponding surface of the traction sheave 52. Exemplary materials for the jacket material 38 include the elastomers of thermoplastic and thermosetting polyurethanes, thermoplastic polyester elastomers, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or combinations thereof. Other materials may be used to form the jacket material 38 if they are adequate to meet the required functions of the belt 32. For example, a primary function of the jacket material 38 is to provide a sufficient coefficient of friction between the belt 32 and the traction sheave 52 to produce a desired amount of traction therebetween. The jacket material 38 should also transmit the traction loads to the tension elements 34. In addition, the jacket material 38 should be wear resistant and protect the tension elements 34 from impact damage, exposure to environmental factors, such as chemicals, for example.

The belt 32 has a belt width 36 and a belt thickness 42, with an aspect ratio of belt width 36 to belt thickness 42 greater than one. The belt 32 further includes a back side 44 opposite the traction side 40 and belt edges 46 extending between the traction side 40 and the back side 44. While ten tension elements 34 are illustrated in the embodiment of FIG. 3, other embodiments may include other numbers of tension elements 34, for example, 6, 8 or 12 tension members 34. Further, while the tension elements 34 of the embodiment of FIG. 3 are substantially identical, in other embodiments, the tension elements 34 may differ from one another. While a belt 32 with a rectangular cross-section is illustrated in FIG. 3, it is to be appreciated that belts 32 having other cross-sectional shapes are contemplated within the scope of the present disclosure.

Figure 4A:
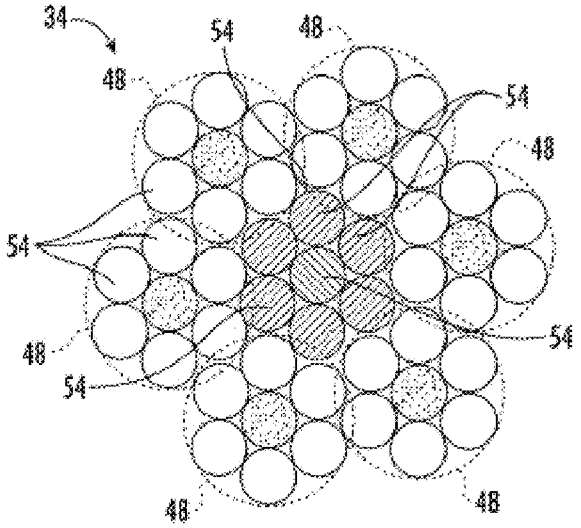
FIG. 4A is a cross-sectional view of an embodiment of a tension element for an elevator suspension member.
Figure 4B:
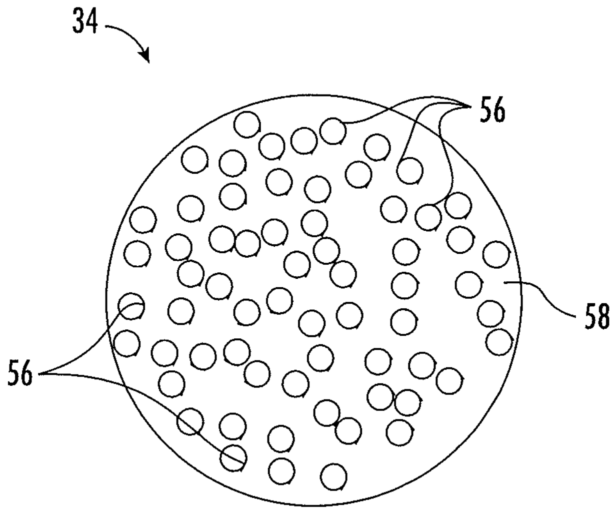
FIG. 4B is another cross-sectional view of an embodiment of a tension element for an elevator belt.

Referring now to FIG. 4A, the tension element 34 may be a plurality of wires 48, for example, steel wires 54 which in some embodiments are formed into one or more strands 48. In other embodiments, such as shown in FIG. 4B, the tension member 34 may include a plurality of fibers 56, such as carbon fiber, glass fiber, aramid fiber, or their combination, disposed in a matrix material 58. Materials such as polyurethane, vinylester, or epoxy may be utilized as the matrix material. While a circular cross-sectional tension member geometry is illustrated in the embodiment of FIG. 4B, other embodiments may include different tension member cross-sectional geometries, such as rectangular or ellipsoidal. While the cross-sectional geometries of the tension elements 34 in FIG. 3 are shown as identical, in other embodiment the tension members' cross-sectional geometries may differ from one another.

To balance the elevator system 10, the compensation and tie-down members 24 together have a compensation mass per unit length roughly equal to the sum of the suspension mass per unit length of the suspension members 16. In some embodiments, the compensation and tie down member mass per unit length is within +/−10% of the sum of the suspension mass per unit length of the suspension members 16. Further, a compensation tensile strength of the compensation and tie-down members 24 is about half of the suspension tensile strength of the suspension members 16. Because of the difference in strength requirement, it is desired to construct the compensation and tie-town members 24 differently from the suspension members 16 to take advantage of the lower tensile strength requirement while also matching the compensation mass per unit length to the suspension mass per unit length.

The suspension members 16 have a tensile load Factor of Safety (FOS) of 12 whereas the compensation and tie-down members 24 have a FOS of 5, resulting in nominally a 2:1 ratio. It should also be noted that lightweight suspension members 16 such as carbon fiber composite belts or synthetic fiber ropes can have (strength/weight/length) values significantly greater than steel wire rope or cords, being nominally 3 to 6 times greater.

Because the ratio of the suspension member FOS divided by the compensation member FOS is about 2:1, using the same tension member for both sides will result in excess strength on the compensation side. The present disclosure is an optimally tuned pair of suspension and compensation members which roughly balance the masses and have a nominally 2:1 ratio in strength. This optimally tuned configuration is associated with the full set of tension members 16, 24 bearing the loads for the elevator system. Thus, the sizing of the individual tension members 16, 24 is not of primary significance, but rather the different (strength/weight/length) ratios.

The current disclosure seeks to develop the optimally tuned compensation and tie down members 24 for elevator systems 10 which use lightweight suspension members 16 that have (strength/weight/length) ratios equal to or greater than 3 times that of convention elevator steel wire rope. For these systems 10, the (strength/weight/length) of steel wire rope is not high enough to have sufficient compensation member strength for nominally balanced tension member set mass. To achieve such an optimal compensation and tie-down member 24, a novel design is employed which uses two or more different compensation tension elements with substantially different (strength/weight/length) values. The different load bearing compensation tension elements are selected so that for two different elements, the ratio of their (strength/weight/length) is 2:1 or larger and for more than two different elements the ratio of the highest and lowest (strength/weight/length) values are 2:1 or larger. This includes the use of nominally non-load bearing material or ballast, such as steel in a non-rope or cord configuration. This configuration provides for balanced compensation to within 20% including the effects of the traveling cable and a strength ratio of nominally 2:1 which could range from 2.5:1 to 1.5:1. As before, this applies most broadly to the set of tension and compensation members, not the individual ones. However, it also can apply to each suspension member individually. As described in this configuration, the different tension elements are incorporated into a single member, thus mechanically coupling them which has the advantage of the tension element supporting the weight of the lower (strength/weight/length) element.

In a broader configuration, the compensation member set can be comprised of individual members with substantially different (strength/weight/length) ratios. An example of this would be to use lightweight suspension members and conventional wire rope side by side. The (strength/weight/length) ratios of the different suspension members would be 2:1 or greater.

Figure 5:
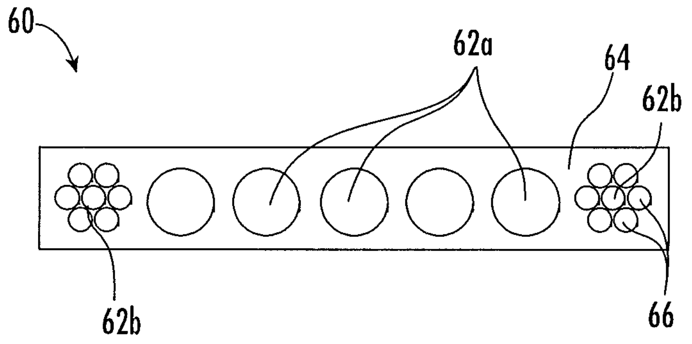
FIG. 5 is a cross-sectional view of an embodiment of an elevator system compensation and tie-down member.

Referring to FIG. 5, is a cross-sectional view of a compensation member 24. In some embodiments, such as shown, the compensation member 24 is configured as a compensation belt 60. The compensation belt 60 includes a plurality of compensation tension elements 62 at least partially enclosed by a compensation member jacket 64. Materials for the compensation member jacket 64 may include the elastomers of thermoplastic and thermosetting polyurethanes, thermoplastic polyester elastomers, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or combinations thereof.

The compensation tension elements 62 are configured and arranged in the compensation belt 60 such that the compensation mass per unit length is substantially equal to the suspension mass per unit length. For example, the total compensation mass per unit length of the compensation and tie-down members 24 is within +/−10% of the total suspension mass per unit length of the suspension members 16. In other embodiments, the total compensation mass per unit length of the compensation and tie-down members 24 is within +/−5% of the total suspension mass per unit length of the suspension members 16. To achieve this, the compensation belt 60 may utilize a combination of lightweight compensation tension elements **62*a* and relatively heavier weight compensation tension elements 62*b*. Compensation tension elements 62*a* and 62*b* may differ in, for example, materials utilized to form the tension elements 62*a* and 62*b*. In some embodiments, the lightweight compensation tension elements 62*a* are formed from a plurality of fibers, such as carbon fiber, glass fiber aramid fiber, or their combination, disposed in a matrix material. Materials such as polyurethane, vinylester, or epoxy may be utilized as the matrix material. The lightweight compensation tension elements 62*a* have a first strength/mass/length. Heavier weight compensation tension elements 62*b* may be a steel cord, formed from a plurality of steel wires arranged into one or more strands 66. The heavier weight compensation tension elements 62*b* have a second strength/mass/length less than the first strength/mass/length. A heavier weight compensation tension element 62*b* formed from steel wires has a mass of about 3.5 times the mass of an equally-sized lightweight compensation tension element 62***a* formed from carbon fibers.

In the embodiment of FIG. 5, a number of compensation belts 60 is equal to a number of suspension belts 32 in the elevator system 10. For example, in an elevator system 10 utilizing four of the belts 32 of FIG. 3, four compensation belts 60, such as those shown in FIG. 5 are utilized. In the embodiment of FIG. 5, the compensation belt 60 utilizes a plurality of lightweight compensation tension elements 62*a*, and a plurality of heavier weight compensation tension elements 62*b*. Because of the higher second weight per unit length of the heavier weight compensation tension elements 62*b*, the total number of compensation tension elements 62 in each compensation belt 60 is fewer that the number of suspension tension elements 34 in each belt 32. This allows the weight per unit length of the compensation belts 60 to balance with the weight per unit length of the suspension belts 32. Further, by this construction the tensile strength of the compensation belts 60 meets, while not overly exceeding, the necessary tensile strength for the compensation belts 60. Such a construction reduces overall cost of the compensation belts 60 by selectively utilizing lower cost heavier weight compensation tension elements 62*b* formed from a plurality of steel wires in place of higher cost lightweight compensation tension elements 62*a*.

Figure 6:
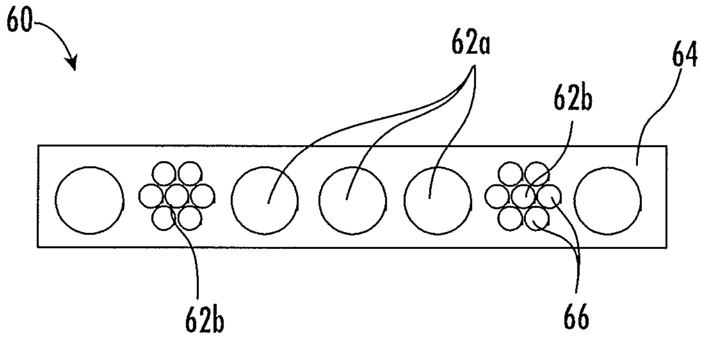
FIG. 6 is a cross-sectional view of another embodiment of an elevator system compensation and tie-down member.

In the embodiment of FIG. 5, the lightweight compensation tension elements 62*a* are located at a lateral center of the compensation belt 60 and the medium weight compensation tension elements 62*b* are located at the laterally outboard ends of the compensation belt 60. It is to be appreciated, however, that other arrangements of the tension elements 62*a* and 62*b* may be utilized, depending on desired properties and performance of the compensation belt 60, such as illustrated in FIG. 6. Further, while two heavier weight compensation tension elements 62*b* and five lightweight compensation tension elements 62*a* are shown in the embodiment of FIG. 5, other quantities of each of lightweight compensation tension elements 62*a* and heavier weight compensation tension elements 62*b* may be utilized, depending on the desired tensile strength and mass per unit length of the compensation belt 60.

Figure 7:
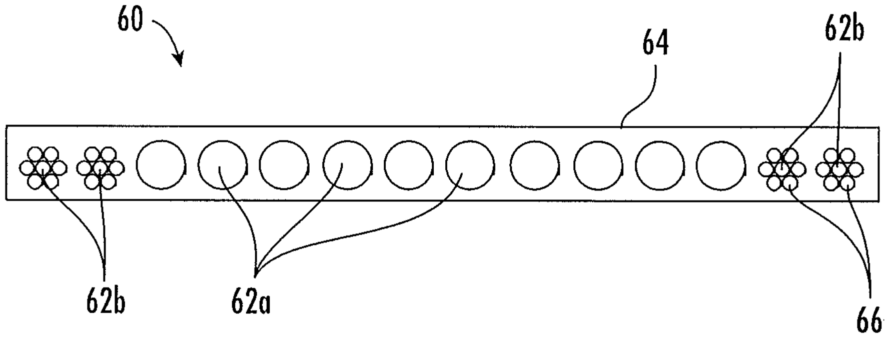
FIG. 7 is a cross-sectional view of yet another embodiment of an elevator system compensation and tie-down member.

In other embodiments, such as shown in FIG. 7, it may be desired that the quantity of compensation belts 60 is less than the amount of suspension belts 32 used in the elevator system 10. As such, the total number of compensation tension elements 62 in each compensation belt 60 is greater that the number of tension elements 34 in each belt 32, but the total number of compensation tension elements 62 in the compensation belts 60 is fewer than the total number of tension elements 34 in the suspension belts 32. In some embodiments, the compensation member jacket 64 may be tuned to provide the needed mass per unit length. For example, additive materials, having a higher density than the jacket material may be added as fillers or ballast to the compensation member jacket 64, as long as the resulting construction meets the requirements for compensation member jacket 64 performance.

Figure 8:
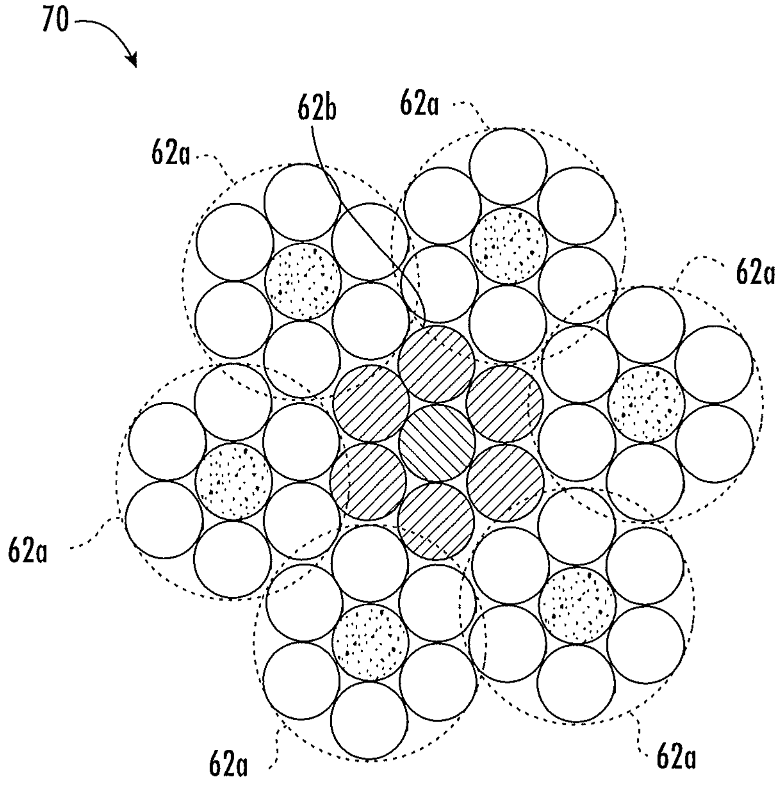
FIG. 8 is a cross-sectional view of an embodiment of an elevator system compensation and tie-down member configured as a rope.
Figure 9:
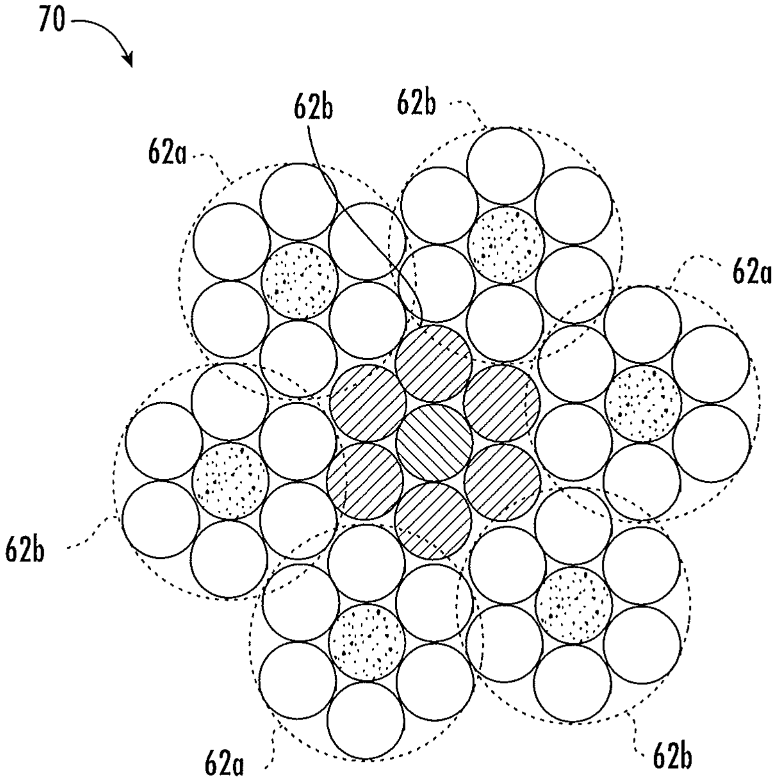
FIG. 9 cross-sectional view of another embodiment of an elevator system compensation and tie-down member configured as a rope.

In other embodiments, illustrated in FIGS. 8 and 9, the compensation and tie down member is configured as rope 70. The rope 70 includes at least one lightweight compensation tension element 62*a* and at least one heavier weight compensation tension element 62*b*. In the embodiment of FIG. 8, the heavier weight compensation element 62*b*, for example, a strand formed from a plurality of steel wires, is located at a center of the rope 70 and serves as a center strand, and a plurality of the lightweight compensation tension elements 62*a* surround the heavier weight compensation tension element 62*b* as outer strands. In another embodiment, shown in FIG. 9, one or more heavier weight compensation tension elements 62*b* are arranged with the lightweight compensation tension elements 62*a* as additional outer strands, in some embodiments in an alternating pattern. Though not illustrated, the rope 70 may include a jacket or coating to retain the strands.

While described herein the context of compensation belts, one skilled in the art would readily appreciate that similar considerations may be applied to elevator systems 10 with other types of suspension members 16 and compensation members 24, such as elevator systems 10 utilizing synthetic fiber ropes.

The benefits of the compensation and tie-down member 24 configurations disclosed herein include reduction in cost of the compensation and tie-down members 24 while still meeting the tensile strength requirements.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compensation and tie-down member arrangement for an elevator system, comprising a plurality of compensation and tie-down members, each compensation and tie down member including:

one or more lightweight compensation tension elements having a first mass per unit length; and one or more heavier weight compensation tension elements having a second mass per unit length greater than the first mass per unit length;

wherein the one or more lightweight compensation tension elements are each formed from a plurality of fibers disposed in a matrix material; and wherein the plurality of fibers include one or more of carbon fibers, glass fibers or aramid fibers;

wherein a total suspension member mass per unit length of a plurality of suspension members of the elevator system is within +/−10% of a total compensation member mass per unit length of the plurality of compensation and tie-down members;

wherein the plurality of suspension members each include a plurality of suspension tension elements, each suspension tension element including a plurality of fibers disposed in a matrix material;

wherein a total number of compensation tension elements in the plurality of compensation and tie-down members is fewer than the total number of suspension tension elements in the plurality of suspension members;

wherein the one or more heavier weight compensation tension elements each comprise a plurality of steel wires;

wherein a tensile strength of the plurality of compensation and tie down members is less than a tensile strength of the plurality of suspension members.

2. The compensation and tie-down arrangement of claim 1, wherein the compensation and tie-town member is configured as a compensation belt with the one or more lightweight compensation tension elements and the one or more heavier weight compensation tension elements are arrayed across a lateral width of the compensation and tie-down member.

3. The compensation and tie-down arrangement of claim 2, further comprising a compensation jacket at least partially encapsulating the one or more lightweight compensation tension elements and the one or more heavier weight compensation tension elements.

4. The compensation and tie-down arrangement of claim 2, wherein the one or more heavier weight compensation tension elements are located at a laterally outermost position in the compensation and tie-down member.

5. The compensation and tie-down member of claim 1, wherein the one or more lightweight compensation tension elements and the one or more heavier weight compensation tension elements are arranged as a rope.

6. The compensation and tie down member of claim 5, wherein the one or more heavier weight compensation tension elements is located at a center of the rope as a center strand, with the one or more lightweight compensation tension elements located as outer strands of the rope.

7. The compensation and tie-down member of claim 5, wherein one or more lightweight compensation tension elements and one or more heavier weight compensation tension elements are arranged as outer strands of the rope.

8. An elevator system, comprising:

a hoistway;

an elevator car movable along the hoistway;

a plurality of suspension members operably connected to the elevator car to move the elevator car along the hoistway;

a counterweight operably connected to the elevator car via the plurality of suspension members; and a plurality of compensation and tie-down members operably connected to the elevator car and the counterweight to stabilize operation of the elevator system, the plurality of compensation and tie-down members including:

one or more lightweight compensation tension elements having a first mass per unit length; and one or more heavier weight compensation tension elements having a second unit mass per unit length greater than the first mass per unit length;

wherein the one or more lightweight compensation tension elements are each formed from a plurality of fibers disposed in a matrix material; and wherein the plurality of fibers include one or more of carbon fibers, glass fibers or aramid fibers;

wherein a total suspension member mass per unit length of the plurality of suspension members is within +/−10% of a total compensation member mass per unit length of the plurality of compensation and tie-down members;

wherein the plurality of suspension members each include a plurality of suspension tension elements, each suspension tension element including a plurality of fibers disposed in a matrix material;

wherein a total number of compensation tension elements in the plurality of compensation and tie down members is fewer than the total number of suspension tension elements in the plurality of suspension members;

wherein the one or more heavier weight compensation tension elements each comprise a plurality of steel wires;

wherein a tensile strength of the plurality of compensation and tie down members is less than a tensile strength of the plurality of suspension members.

9. The elevator system of claim 8, wherein the number of compensation and tie-down members is fewer than the number of suspension members.

10. The elevator system of claim 8, wherein the compensation and tie-down member is configured as a compensation belt with the one or more lightweight compensation tension elements and the one or more heavier weight compensation tension elements are arrayed across a lateral width of the compensation and tie-down member.

11. The elevator system of claim 10, further comprising a compensation jacket at least partially encapsulating the one or more lightweight compensation tension elements and the one or more heavier weight compensation tension elements.

12. The elevator system of claim 10, wherein the one or more heavier weight compensation tension elements are located at a laterally outermost position in the compensation and tie-down member.

13. The elevator system of claim 8, wherein the one or more lightweight compensation tension elements and the one or more heavier weight compensation tension elements as arranged as a rope.

* * * * *